(12) United States Patent
Katlan et al.

(10) Patent No.: US 12,021,417 B2
(45) Date of Patent: Jun. 25, 2024

(54) DRIVE ASSEMBLY FOR A VEHICLE, AND VEHICLE

(71) Applicant: Robert Bosch GmbH, Stuttgart (DE)

(72) Inventors: Gergo Jozsef Katlan, Budapest (HU); Denes Zsiga, Budapest (HU); Kejing Yang, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 122 days.

(21) Appl. No.: 17/920,608

(22) PCT Filed: Mar. 25, 2021

(86) PCT No.: PCT/EP2021/057714
§ 371 (c)(1),
(2) Date: Oct. 21, 2022

(87) PCT Pub. No.: WO2021/213774
PCT Pub. Date: Oct. 28, 2021

(65) Prior Publication Data
US 2023/0155455 A1    May 18, 2023

(30) Foreign Application Priority Data

Apr. 23, 2020   (DE) .................... 10 2020 205 151.8

(51) Int. Cl.
*H02K 11/00*   (2016.01)
*H02K 5/22*    (2006.01)
(Continued)

(52) U.S. Cl.
CPC ......... *H02K 11/0141* (2020.08); *H02K 5/225* (2013.01); *H02K 11/33* (2016.01)

(58) Field of Classification Search
CPC .................................................. H02K 11/0141
See application file for complete search history.

(56) References Cited

U.S. PATENT DOCUMENTS

| 5,491,370 A | * | 2/1996 | Schneider | .............. | H02K 11/33 |
|  |  |  |  |  | 310/68 R |
| 2013/0313930 A1 | * | 11/2013 | Fuchs | .................. | B60K 7/0007 |
|  |  |  |  |  | 310/83 |

(Continued)

FOREIGN PATENT DOCUMENTS

| DE | 102012222683 A1 | 6/2014 |
| DE | 102016202463 A1 | 8/2016 |

(Continued)

OTHER PUBLICATIONS

Translation of International Search Report for Application No. PCT/EP2021/057714 dated Jul. 21, 2021 (2 pages).

*Primary Examiner* — Hung V Ngo
(74) *Attorney, Agent, or Firm* — Michael Best & Friedrich LLP

(57) ABSTRACT

A drive assembly for a vehicle includes a converter having a converter housing and an electric converter circuit disposed in the converter housing, an electric machine having a machine housing disposed adjacent to the converter housing and a stator/rotor arrangement disposed in the machine housing, a plurality of conductor bars which electrically connect the converter circuit and the stator/rotor arrangement and extend through first passage openings formed in the converter housing and through second passage openings formed in the machine housing, and a shielding frame which is made of an electrically conductive material, is disposed between the converter housing and the machine housing, encloses the plurality of conductor bars and abuts the converter housing and the machine housing.

18 Claims, 4 Drawing Sheets

(51) Int. Cl.
*H02K 11/01* (2016.01)
*H02K 11/33* (2016.01)

(56) References Cited

U.S. PATENT DOCUMENTS

| | | | |
|---|---|---|---|
| 2016/0006316 A1* | 1/2016 | Modi | H02K 11/33 |
| | | | 310/43 |
| 2016/0172943 A1* | 6/2016 | Schmieder | H02K 11/0141 |
| | | | 310/85 |
| 2017/0008554 A1* | 1/2017 | Hirotani | B62D 5/0406 |
| 2020/0185997 A1* | 6/2020 | Hirasawa | H02K 7/14 |
| 2021/0175780 A1* | 6/2021 | Sano | F16C 19/54 |
| 2021/0384802 A1* | 12/2021 | Tamura | H02K 3/28 |
| 2022/0060089 A1* | 2/2022 | Benecke | H02K 11/0141 |

FOREIGN PATENT DOCUMENTS

| | | |
|---|---|---|
| DE | 112014006362 T5 | 11/2016 |
| DE | 102016203553 A1 | 9/2017 |
| EP | 3512078 A1 | 7/2019 |
| JP | S5667996 A | 6/1981 |
| JP | S62193300 A | 8/1987 |
| JP | H02148895 A | 6/1990 |
| JP | H09130076 A | 5/1997 |
| JP | H10190277 A | 7/1998 |
| JP | 2012239350 A | 12/2012 |
| WO | 2009130249 A1 | 10/2009 |
| WO | 2018197473 A1 | 11/2018 |
| WO | 2020026464 A1 | 2/2020 |

\* cited by examiner

DRIVE ASSEMBLY FOR A VEHICLE, AND VEHICLE

BACKGROUND OF THE INVENTION

Electric drives are increasingly being used in vehicles such as cars, trucks, buses or the like. Three-phase or alternating current motors are frequently used as the electric drive machine. The electrical AC voltage required for this type of drive machine is often generated from a DC voltage by a converter or inverter. The converter and the electric drive machine are typically combined to form a drive assembly and are mechanically connected to one another accordingly, wherein a housing of the converter and a housing of the electric machine are expediently disposed adjacent to one another. The AC voltage generated by the converter can typically be transmitted to the electric machine via conductor bars which extend at least partially on the outside of the housings.

It is desirable to keep electromagnetic radiation emitted by the drive assembly as low as possible, e.g., to protect electronic devices in the vicinity of the drive assembly.

To reduce the electromagnetic radiation emanating from an electric motor, WO 2009/130249 A1 describes accommodating a transmission and an electric motor in a housing composed of partial housings and additionally shielding brush elements of the electric motor with metallic covers. WO 2018/197473 A1 describes an actuator for adjusting movable parts in a vehicle with an electric motor disposed in a pole housing and an electronics housing made of plastic connected to said pole housing, wherein the electronics housing comprises a cover of metal material and contact elements which connect the cover to the pole housing in an electrically conductive manner. DE 10 2012 222 683 A1 describes an electric motor comprising a housing with a housing pot made of metal, a housing cover made of metal and a plug part made of plastic disposed between the housing pot and the housing cover, wherein clips are provided which connect the housing pot and the housing cover mechanically and electrically. DE 10 2016 203 553 A1 moreover describes a battery assembly with a housing that comprises an electrical shield.

SUMMARY OF THE INVENTION

According to the invention, a drive assembly and a vehicle are provided.

According to a first aspect of the invention, a drive assembly for a vehicle, for example a road vehicle, such as a car, a truck, a bus, a motorcycle or the like, is provided.

The drive assembly includes a converter comprising a converter housing and an electric converter circuit disposed in said converter housing, e.g., an inverter circuit or a rectifier circuit, and an electric machine comprising a machine housing disposed adjacent to the converter housing and a stator/rotor arrangement disposed in the machine housing. The machine housing and the converter housing are optionally connected mechanically, for example bolted to one another. A housing wall of the converter housing and a housing wall of the machine housing are thus disposed adjacent to one another and can extend parallel or along one another, for example, whereby a housing gap is formed between the housing walls.

A plurality of conductor bars which electrically connect to the converter circuit and the stator/rotor arrangement are furthermore provided and extend through first passage openings formed in the converter housing and through second passage openings formed in the machine housing. For example. two, three or more conductor bars or busbars can be provided, which are made of an electrically conductive material, e.g., aluminum or copper. The conductor bars project through the passage openings formed in the adjacent housing walls and extend through the housing gap.

The drive assembly further comprises a shielding frame which is made of an electrically conductive material, is disposed between the converter housing and the machine housing, encloses the plurality of conductor bars and abuts the converter housing and the machine housing. The shielding frame is a closed frame that defines a frame opening through which the busbars or conductor bars project. The shielding frame is in mechanical contact with both the machine housing and the converter housing, which can both likewise be made of an electrically conductive material. This creates a type of Faraday cage around the conductor bars. Electromagnetic waves emitted by the conductor bars can thus be distributed by the shielding frame or induce an oppositely directed electrical field in the shielding frame, which at least partially compensates for the emitted electromagnetic waves. This advantageously achieves improved shielding of the drive assembly against escaping electromagnetic radiation.

Another advantage of the described structure is that the shielding frame is easily to mount, e.g., by clamping it into the housing gap between the converter housing and the machine housing. The shielding frame is furthermore very easy to replace.

According to a further aspect of the invention, a vehicle comprising a drive assembly according to the first aspect of the invention is provided. The vehicle can in particular be a road vehicle, such as a car, a truck, a bus, a motorcycle or the like. The drive assembly can optionally additionally comprise a transmission coupled to an output shaft of the stator/rotor unit of the electric machine.

According to some embodiments, it can be provided that the shielding frame be made of a metal material. The shielding frame can be made of copper, aluminum or sheet steel, for example.

According to some embodiments, it can be provided that the shielding frame comprise a flat base portion and a plurality of elastic elements which project from said base portion. The base portion defines both the perimeter of the shielding frame and the frame opening and can be implemented as a circular or rectangular-shaped part, for example, which defines a plane. Elastic portions, which project from the frame plane defined by the base portion and are disposed distributed along the perimeter of the shielding frame, project from the base portion. The elastic portions or elements can in particular be configured in one piece with the base portion. The elastic portions can be produced by bending, for example. The elastic portions abut the converter housing and/or the machine housing and are deformed or pressed in the direction of the base portion by the converter housing and the machine housing. This achieves electrical and mechanical contact between the housings and the shielding frame in a further improved manner. Tolerances of the housings, which can lead to a non-uniform gap width of the housing gap created between the converter housing and the machine housing, can thus in particular be better balanced.

According to some embodiments, it can be provided that at least one of the elastic elements be configured as an arm which extends along a perimeter of the shielding frame defined by the base portion. In principle, it is also possible for all of the elastic elements to be configured as arms. The respective arm thus extends along the perimeter of the shielding frame and projects from the frame plane or extends at an angle relative to the base portion. The arms can all be provided on the same side of the frame plane from the base portion, for example, or some of the arms can project from the base portion on a first side of the frame plane and some arms can project from the base portion on a second side of the frame plane. The arms act as springs that improve reliable contact between the shielding frame and the converter housing and the machine housing.

According to some embodiments, it can be provided that the arm comprise an end region which is located away from the base portion and extends in a curved manner. One end of the respective arm can therefore be bent in the direction of the base portion. This achieves a better defined contact between the respective arm and the respective housing.

According to some embodiments, it can be provided that at least one of the elastic elements be configured as a profile piece which projects into a frame opening defined by the base portion. The profile piece also acts as a spring and thus contributes to an even more reliable contact between the shielding frame and the respective housing. In principle, it is conceivable that both profile pieces and arms or only arms or only profile pieces are provided on a base portion as elastic elements.

According to some embodiments, it can be provided that the profile piece be configured in a step-like manner. A first step portion can extend from the base portion into the frame opening, for example, a second step portion connected to the first step portion can extend transverse to the first step portion and thus transverse to the frame plane and a third step portion can be connected to the second step portion and extend transverse to said second step portion or parallel to the frame plane further into the frame opening. This provides an elastic element that is relatively difficult to deform. Electrical and mechanical contact between the respective housings and the shielding frame can thus be achieved in an even more reliable manner.

According to some embodiments, it can be provided that the shielding frame comprises wave portions which extend in an alternatingly curved manner with respect to a frame plane and are elastically deformable, wherein the wave portions located on a first side of the frame plane abut the converter housing and the wave portions located on a second side of the frame plane abut the machine housing. The shielding frame can in particular have a substantially sinusoidal profile. The respective individual curved sections thus project on different sides from the frame plane and abut the converter housing or the machine housing. The advantages of this wavy configuration of the shielding frame are in particular a simple, one-piece structure and a simple, cost-effective manufacturability.

According to some embodiments, it can be provided that, at extreme points of the wave portions located opposite to one another with respect to the frame plane, projections are configured which abut the converter housing or the machine housing. The projections can be formed by approximately spherical accumulations of material, for example. This achieves a better defined contact between the respective housing and the shielding frame.

With respect to direction indications and axes, in particular direction indications and axes relating to the course of physical structures, a course of an axis, a direction or a structure "along" another axis, direction or structure is understood here to mean that said axis, direction or structure, in particular the tangents resulting at a respective location of the structures, extend at an angle of less than or equal to 45 degrees, preferably less than 30 degrees and particularly preferably parallel to one another.

With respect to direction indications and axes, in particular direction indications and axes relating to the course of physical structures, a course of an axis, a direction or a structure "transverse" to another axis, direction or structure is understood here to mean that said axis, direction or structure, in particular the tangents resulting at a respective location of the structures, extend at an angle of greater than or equal to 45 degrees, preferably greater than or equal to 60 degrees and particularly preferably perpendicular to one another.

BRIEF DESCRIPTION OF THE DRAWINGS

The invention will be explained in the following with reference to the figures of the drawings. The figures show.

Unless otherwise stated, the same reference signs refer to the same or functionally identical components in the figures.

DETAILED DESCRIPTION

Figure 1:
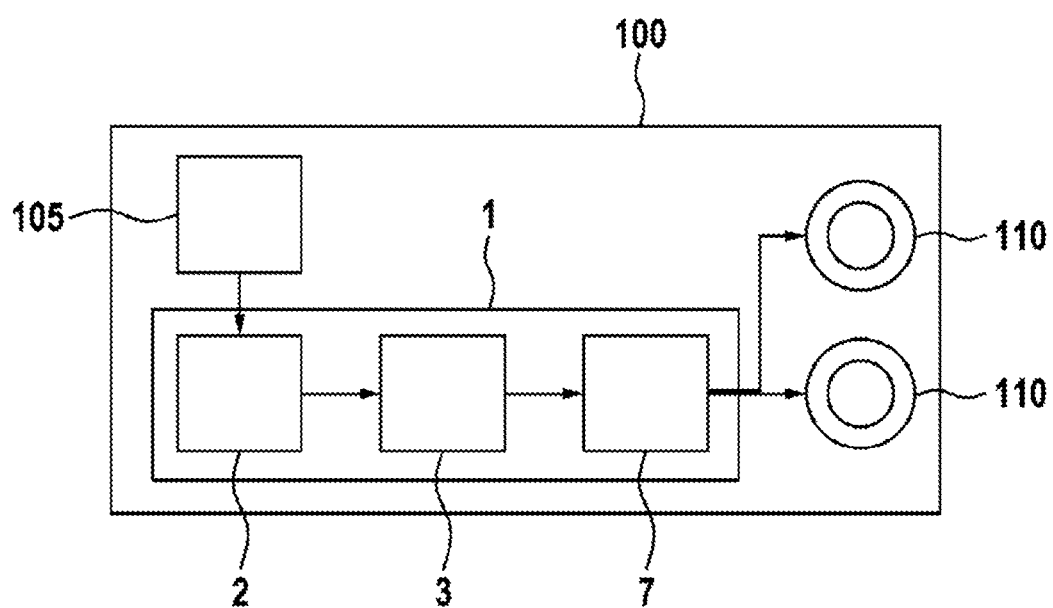
FIG. 1 a schematic block diagram of a vehicle according to a design example of the invention.

FIG. 1 shows a schematic block diagram of a vehicle 100. As shown as an example in FIG. 1, the vehicle 100 can comprise a drive assembly 1, an electrical energy source 105, e.g., in the form of a battery, and one or more wheels 110 kinematically coupled to the drive assembly 1.

As shown schematically in FIG. 1, drive assembly 1 can comprise a converter 2, an electric machine 3, and an optional transmission 7. The converter 2 is electrically connected to the energy source 105 and is configured to convert the electrical voltage, e.g., a DC voltage, supplied by the electrical energy source 105 to an operating voltage, e.g., an AC voltage. The converter 2 can thus in particular comprise an inverter circuit.

The electric machine 3 can in particular be a three-phase machine, which can be operated as a motor and optionally also as a generator. The electric machine 3 is electrically connected to the converter 2 and can be operated by the voltage supplied by the converter 2.

The optional transmission 7 is kinematically connected to an output shaft (not shown in FIG. 1) of the electric machine 3, and is configured to translate the torque provided by the output shaft of the electric machine 3 to an operating torque. The wheels 110 of the vehicle 100 are kinematically coupled to the transmission 7 and can thus be driven by the electric machine 3.

Figure 2:
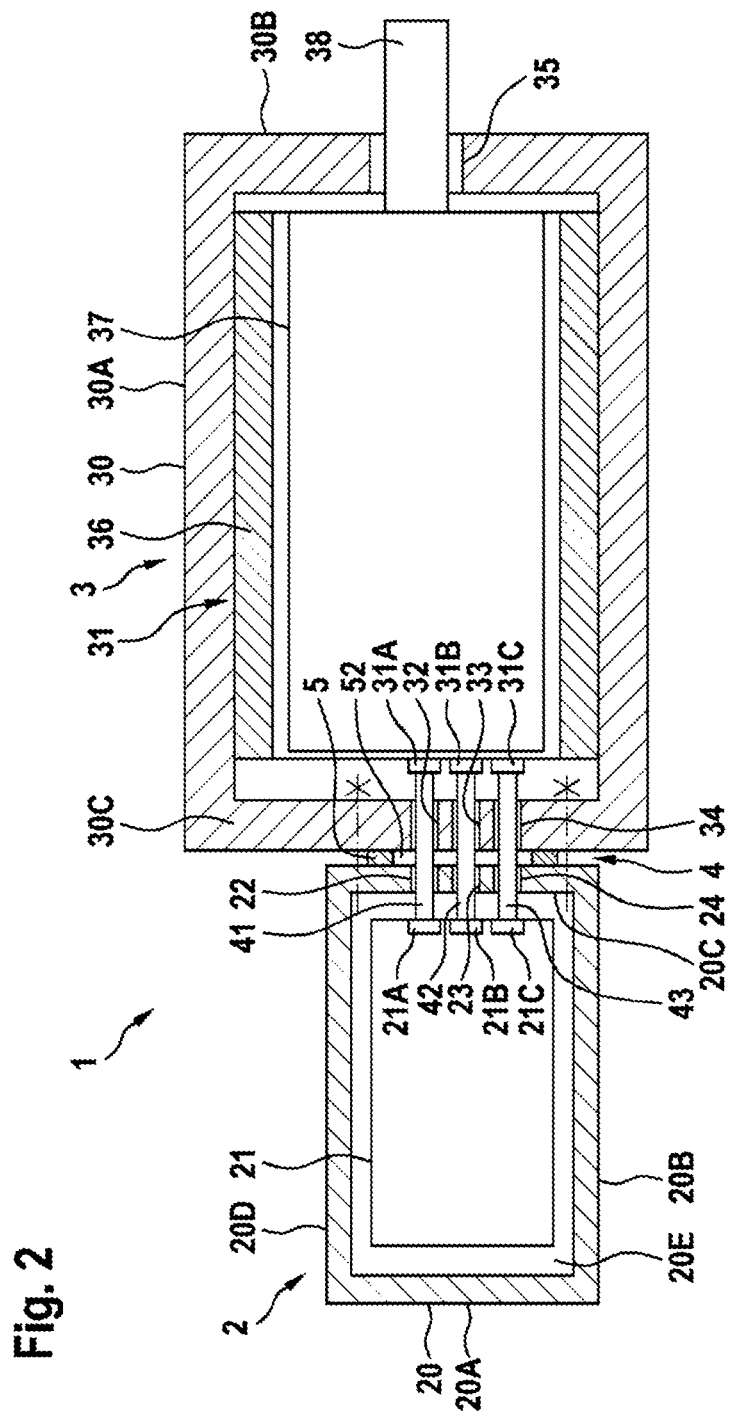
FIG. 2 a schematic sectional view of a drive assembly according to a design example of the invention.

FIG. 2 shows an example of a drive assembly 1, which can be installed in the vehicle 100 shown as an example in FIG. 1. As shown as an example in FIG. 2, drive assembly 1 can comprise a converter 2, an electric machine 3 and a shielding frame 5. Of course, the drive assembly 1 can also comprise an optional transmission 7, which is not shown in FIG. 2.

As shown schematically in FIG. 2, the converter 2 can comprise a converter housing 20 and an electric converter circuit 21 disposed in said converter housing 20. The converter housing 20 defines a closed interior space. The converter housing 20 can comprise a plurality of walls 20A, 20B, 20C, 20D, 20E, for example, which together delimit the interior space. In FIG. 2, the converter housing 20 is shown, purely as an example, as a cuboid housing. Of course, other shapes are conceivable too, e.g., cylinder or pot-shaped. A plurality of first passage openings 22, 23, 24 can be formed in an end wall 20C or generally in a wall of the converter housing 20. Three first passage openings 22, 23, 24, which are formed adjacent to one another in the end wall 20C, are provided in FIG. 2 purely as an example. The converter housing 20 can be made of an electrically conductive material, in particular a metal material, such as an aluminum alloy, cast steel or the like.

The electric converter circuit 21 is shown in FIG. 2 merely symbolically as a block and can be configured as an inverter circuit, for example, with which an electrical DC voltage can be converted into an electrical AC voltage. Output interfaces 21A, 21B, 21C, at which the converter circuit 21 provides an output or operating voltage for the electric machine 3, are shown schematically and purely as an example in FIG. 2. The converter circuit 21 is disposed in the interior space defined by the converter housing 20.

As further shown in FIG. 2, the electric machine 3 comprises a machine housing 30 and a stator/rotor arrangement 31 disposed in the machine housing 30. As shown as an example in FIG. 2, the machine housing 30 can have a cylindrical cross-sectional shape with a peripheral wall 30A and opposite end walls 30B, 30C. The machine housing 30 generally defines an interior space, in which the stator/rotor arrangement 31 is disposed. A number of second passage openings 32, 33, 34 corresponding the number of first passage openings 22, 23, 24 are formed in a housing wall of the machine housing 30, e.g., in one of the end walls 30B, 30C. A rotor shaft opening 35 can furthermore be formed on the opposite end wall 30B. The machine housing 30 can be made of an electrically conductive material, in particular a metal material, such as an aluminum alloy, cast steel or the like.

The stator/rotor arrangement 31 is shown merely schematically in FIG. 2 and can in particular comprise a stator 36 and a rotor 37 which is rotatable relative to the stator 36. As shown as an example in FIG. 2, the rotor 37 can be rotatable within the stator 36, for example. A rotor shaft 38 can be connected to the rotor 37 in a rotationally fixed manner and project through the rotor shaft opening 35. An optional transmission (not shown in FIG. 2) can be connected to the rotor shaft 38.

As shown schematically in FIG. 2, the machine housing 30 and the converter housing 20 are disposed adjacent to one another, whereby the end wall 20C of the converter housing 20, in which the first passage openings 23, 24, 25 are formed, faces the end wall 30C of the machine housing 30, in which the second passage openings 32, 33, 34 are formed. As shown schematically in FIG. 2, a gap 4 can be formed between the end wall 30C of the machine housing 30 and the end wall 20C of the converter housing 20. The converter housing 20 and the machine housing 30 are optionally mechanically connected to one another, e.g., bolted to one another, as shown symbolically in FIG. 2.

The stator/rotor arrangement 31 is electrically connected to the converter circuit 21. Conductor bars or busbars 41, 42, 43 can in particular be provided, which extend from the interior space of the converter housing 30 through the first passage openings 22, 23, 24, across the gap 4 and through the second passage openings 32, 33, 34 into the interior of the machine housing 3. The conductor bars 41, 42, 43 can respectively be electrically connected to the output interfaces 21A, 21B, 21C of the converter circuit 21 and input interfaces 31A, 31B, 31C of the stator/rotor arrangement 31, as shown schematically in FIG. 2.

As also shown schematically in FIG. 2, a shielding frame 5 is disposed between the converter housing 20 and the machine housing 30. The shielding frame 5 is thus disposed in the gap 4 between the end wall 30C of the machine housing 30 and the end wall 20C of the converter housing 20 and abuts these walls 20C, 30C. The shielding frame 5 can in particular be clamped between the machine housing 30 and the converter housing 20. The shielding frame 5 is configured as a closed frame and encloses the conductor bars 41, 42, 43. The shielding frame 5 thus defines a frame opening 52 through which the conductor bars 41, 42, 43 extend, as shown symbolically in FIG. 2. The shielding frame 5 is made of an electrically conductive material, e.g., a metal material, such as an aluminum sheet, a copper sheet, a sheet steel or the like. The shielding frame 5 thus forms a type of Faraday cage, which counteracts the emission of electromagnetic radiation from the conductor bars 41, 42, 43.

Figure 3:
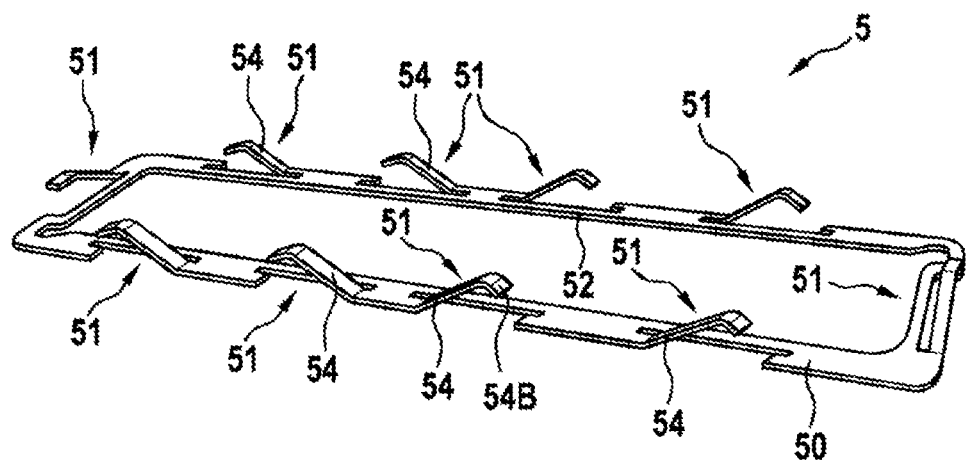
FIG. 3 a perspective view of a shielding frame of a drive assembly according to a design example of the invention.
Figure 4:
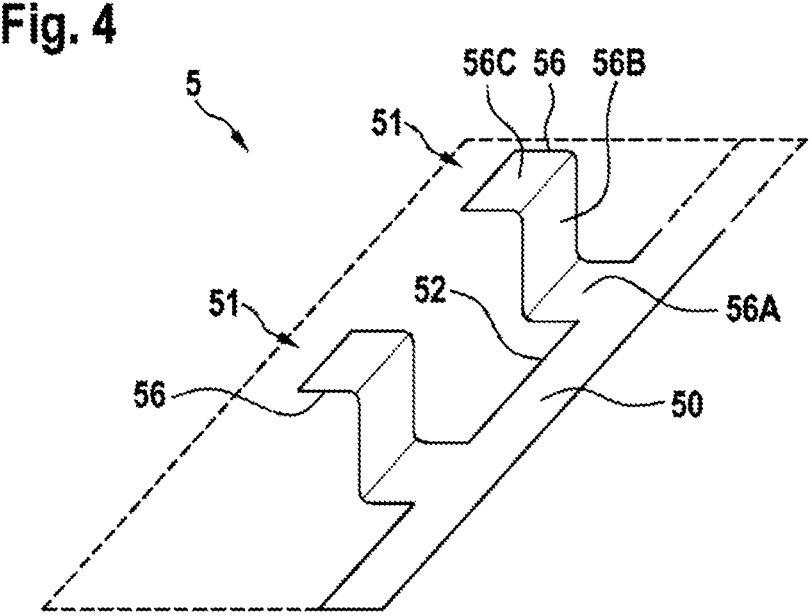
FIG. 4 a cutaway perspective view of a shielding frame of a drive assembly according to another design example of the invention.
Figure 5:
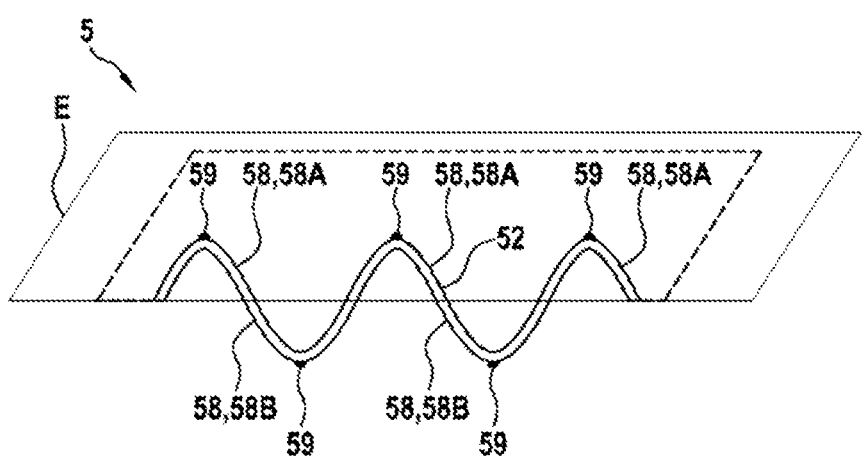
FIG. 5 a cutaway perspective view of a shielding frame of a drive assembly according to another design example of the invention.

FIGS. 3 to 5 show different possible configurations of the shielding frame 5. FIG. 3 shows an example of a shielding frame 5 comprising a base portion 50 defining the frame opening 52 and a plurality of elastic elements 51 in the form of arms 54.

As shown as an example in FIG. 3, the base portion 50 can have a substantially rectangular-shaped perimeter. The base portion could alternatively also have a circular or triangular perimeter or some other closed perimeter. The base portion 50 can in particular define a plane. The base portion 50 can be produced by punching the perimeter and the frame opening 52 out of a flat metal sheet, for example.

The elastic elements 51, which are implemented in FIG. 3 as arms 54, are disposed distributed along the perimeter of the base portion 50 and project from said base portion 50. FIG. 3 shows as an example that all of the arms 54 project from the same side of the base portion 50. It is also conceivable that arms 54 project from both sides of the base portion 50. As shown as an example in FIG. 3, each arm 54 can extend along the perimeter of the base portion 50, in particular on the outside of the frame opening 52. The arms 54 can be configured in one piece with the base portion 50, for example, for instance as bent portions. As further shown as an example in FIG. 3, it can optionally be provided that the arms 54 each comprise an end region 54B which is located away from the base portion 50 and extends in a curved manner, e.g., curved in the direction of the base portion 50. The arms 54 are elastically deformable relative to the base portion 50, so that they abut the end wall 20C of the converter housing 20 or the end wall 30C of the machine housing 30 and are bent in the direction of the base portion 50 when the shielding frame 50 is disposed between the housings 20, 30.

FIG. 4 schematically shows a shielding frame 5, which likewise comprises a flat base portion 50 and a plurality of elastic elements 51 that project from the base portion 50. In the shielding frame 5 shown as an example in FIG. 4, the elastic elements 51 are configured as profile pieces 56, which project into the frame opening 52 defined by the base portion 50. For example, the profile pieces 56 can be configured in a step-like or Z-shaped manner, as shown schematically in FIG. 4. For example, each profile piece 56 can comprise a first step portion 56A which projects from the base portion 50 into the frame opening 52, a second step portion 56B connected to the first step portion 56A which extends transverse to the first step portion 56A or transverse to the frame plane, and a third step portion 56C which is connected to the second step portion 56B and extends transverse to said second step portion or parallel to the frame plane further into the frame opening 52, as shown schematically in FIG. 4.

FIG. 3 shows purely as an example that all of the elastic elements 51 of the shielding frame 5 are configured as arms 54. FIG. 4 shows, likewise as an example, that all of the elastic elements 51 of the shielding frame 5 are configured as profile pieces 56. It is also conceivable that a shielding frame 5 comprises both elastic elements 51 configured as arms 54 and elastic elements 51 configured as profile pieces 56.

As an example, FIG. 5 schematically shows a shielding frame 5 having a wavy configuration. The shielding frame 5 can have a substantially sinusoidal profile, for example. The shielding frame 5 can in particular comprise a plurality of wave portions 58, which adjoin one another in the peripheral direction of the frame, extend in an alternatingly curved manner with respect to a frame plane E and are elastically deformable. The wave portions 58 are in particular alternately disposed on a first and a second side of the frame plane E, which forms a central plane. The wave portions 58A located on the first side of the frame plane E can have a first curvature and the wave portions 58B located on the second side of the frame plane E can have an opposite second curvature, for example. When the shielding frame 5 is disposed between the converter housing 20 and the machine housing 30, the wave portions 58A located on the first side of the frame plane E abut the converter housing 20 and the wave portions 58B located on the second side of the frame plane E abut the machine housing 30.

As further shown as an example in FIG. 5, at extreme points of the wave portions 58 located opposite to one another with respect to the frame plane E, optional, for example spherical, projections 59 can be configured which abut the converter housing 20 or the machine housing 30. The extreme points have a maximum distance to the frame plane E with respect to a direction perpendicular to the frame plane E.

Although the present invention has been explained above with reference to design examples, it is not limited thereto and can instead be modified in a variety of ways. Combinations of the above design examples are in particular conceivable as well.

The invention claimed is:

1. A drive assembly (1) for a vehicle (100), the drive assembly including:
a converter (2) comprising a converter housing (20) and an electric converter circuit (21) disposed in said converter housing (20);
an electric machine (3) comprising a machine housing (30) disposed adjacent to the converter housing (20), and comprising a stator/rotor arrangement (31) disposed in the machine housing (30);
a plurality of conductor bars (41; 42; 43) which electrically connect to the converter circuit (21) and the stator/rotor arrangement (31) and extend through first passage openings (22; 23; 24) formed in the converter housing (20) and through second passage openings (32; 33; 34) formed in the machine housing (30); and
a shielding frame (5) which is made of an electrically conductive material, is disposed between the converter housing (20) and the machine housing (30), encloses the plurality of conductor bars (41; 42; 43) and abuts the converter housing (20) and the machine housing (30).

2. The drive assembly (1) according to claim 1, wherein the shielding frame (5) is made of a metal material.

3. The drive assembly (1) according to claim 1, wherein the shielding frame (5) comprises a flat base portion (50) and a plurality of elastic elements (51) which project from said base portion (50).

4. The drive assembly (1) according to claim 3, wherein at least one of the elastic elements (51) is configured as an arm (54) which extends along a perimeter of the shielding frame (5) defined by the base portion (50).

5. The drive assembly (1) according to claim 4, wherein the arm (54) comprises an end region (54B) which is located away from the base portion (50) and extends in a curved manner.

6. The drive assembly (1) according to claim 3, wherein at least one of the elastic elements (51) is configured as a profile piece (56) which projects into a frame opening (52) defined by the base portion (50).

7. The drive assembly (1) according to claim 6, wherein the profile piece (56) is configured in a step-like manner.

8. The drive assembly (1) according to claim 1, wherein the shielding frame (5) comprises wave portions (58) which extend in an alternatingly curved manner with respect to a frame plane (E) and are elastically deformable, and wherein the wave portions (58A) located on a first side of the frame plane (E) abut the converter housing (20) and the wave portions (58B) located on a second side of the frame plane (E) abut the machine housing (30).

9. The drive assembly (1) according to claim 8, wherein, at extreme points of the wave portions (58) located opposite to one another with respect to the frame plane (E), projections (59) are configured which abut the converter housing (20) or the machine housing (30).

10. A vehicle (100) comprising a drive assembly (1) according to claim 1.

11. The vehicle (1) according to claim 10, wherein the shielding frame (5) is made of a metal material.

12. The vehicle (1) according to claim 11, wherein the shielding frame (5) comprises a flat base portion (50) and a plurality of elastic elements (51) which project from said base portion (50).

13. The vehicle (1) according to claim 12, wherein at least one of the elastic elements (51) is configured as an arm (54) which extends along a perimeter of the shielding frame (5) defined by the base portion (50).

14. The vehicle (1) according to claim 13, wherein the arm (54) comprises an end region (54B) which is located away from the base portion (50) and extends in a curved manner.

15. The vehicle (1) according to claim 14, wherein at least one of the elastic elements (51) is configured as a profile piece (56) which projects into a frame opening (52) defined by the base portion (50).

16. The vehicle (1) according to claim 15, wherein the profile piece (56) is configured in a step-like manner.

17. The vehicle (1) according to claim 11, wherein the shielding frame (5) comprises wave portions (58) which extend in an alternatingly curved manner with respect to a frame plane (E) and are elastically deformable, and wherein the wave portions (58A) located on a first side of the frame plane (E) abut the converter housing (20) and the wave portions (58B) located on a second side of the frame plane (E) abut the machine housing (30).

18. The vehicle (1) according to claim 17, wherein, at extreme points of the wave portions (58) located opposite to one another with respect to the frame plane (E), projections (59) are configured which abut the converter housing (20) or the machine housing (30).

\* \* \* \* \*